United States Patent
Allen et al.

(10) Patent No.: US 10,915,713 B2
(45) Date of Patent: *Feb. 9, 2021

(54) APPARATUS, METHODS AND COMPUTER PROGRAMS FOR ENABLING INFORMATION TO BE READ FROM AN APPARATUS

(71) Applicant: Nokia Technologies Oy, Espoo (FI)

(72) Inventors: Mark Allen, Great Cambourne (GB); Chris Bower, Cambridge (GB); Darryl Cotton, St. Ives (GB); Yinglin Liu, Cambridge (GB)

(73) Assignee: Nokia Technologies Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 16/293,832

(22) Filed: Mar. 6, 2019

(65) Prior Publication Data

US 2019/0197264 A1 Jun. 27, 2019

Related U.S. Application Data

(63) Continuation of application No. 15/329,715, filed as application No. PCT/FI2015/050504 on Jul. 16, 2015, now Pat. No. 10,248,820.

(30) Foreign Application Priority Data

Aug. 1, 2014 (EP) .................................. 14179576

(51) Int. Cl.
*G06K 7/08* (2006.01)
*G06K 19/07* (2006.01)
(Continued)

(52) U.S. Cl.
CPC ........... *G06K 7/089* (2013.01); *G06F 1/1626* (2013.01); *G06F 1/1637* (2013.01);
(Continued)

(58) Field of Classification Search
CPC ...... G06K 7/0088; G06F 3/1454; G06F 3/147
(Continued)

(56) References Cited

U.S. PATENT DOCUMENTS 8,267,576 B2 9/2012 Haarer et al.
10,248,820 B2* 4/2019 Allen ..................... G06F 3/044
(Continued)

FOREIGN PATENT DOCUMENTS

CN 103020554 4/2013
CN 103430187 12/2013
(Continued)

OTHER PUBLICATIONS

"Sense and Sensor-Bility: Access Mobile Device Sensors With JavaScript", Mobiforge, Retrieved on Jan. 25, 2017, Webpage available at : https://mobiforge.com/design-development/sense-and-sensor-bility-access-mobile-device-sensors-with-javascript.
(Continued)

*Primary Examiner* — Ahshik Kim
(74) *Attorney, Agent, or Firm* — Alston & Bird LLP

(57) ABSTRACT

An apparatus and method and electronic device, the apparatus comprising: a memory element configured to store information; a switching element coupled to the memory element; wherein the switching element is configured to be switched from a first state to a second state in response to an input signal provided by a capacitive touch screen and wherein when the switching element is in the second state the information can be read from the memory element by the capacitive touch screen.

16 Claims, 7 Drawing Sheets

(51) Int. Cl.
G06K 19/077 (2006.01)
G06F 1/16 (2006.01)
G06F 3/041 (2006.01)
G06F 3/00 (2006.01)
G06F 3/044 (2006.01)

(52) U.S. Cl.
CPC .......... *G06F 1/1643* (2013.01); *G06F 1/1684* (2013.01); *G06F 1/1696* (2013.01); *G06F 3/002* (2013.01); *G06F 3/044* (2013.01); *G06F 3/0416* (2013.01); *G06K 7/081* (2013.01); *G06K 19/0716* (2013.01); *G06K 19/07707* (2013.01); *G06F 3/00* (2013.01)

(58) Field of Classification Search
USPC ........................................................ 235/451
See application file for complete search history.

(56) References Cited

U.S. PATENT DOCUMENTS

| | | | |
|---|---|---|---|
| 2007/0203650 A1 | 8/2007 | Jensen et al. | |
| 2009/0167699 A1 | 7/2009 | Rosenblatt et al. | |
| 2011/0029413 A1 | 2/2011 | Ben-Tzur et al. | |
| 2011/0253789 A1 | 10/2011 | Thiele et al. | |
| 2011/0260842 A1 | 10/2011 | Colley | |
| 2012/0125993 A1 | 5/2012 | Thiele et al. | |
| 2013/0112755 A1 | 5/2013 | Allen et al. | |
| 2013/0176252 A1 | 7/2013 | Frojdh | |
| 2013/0271265 A1 | 10/2013 | Finn | |
| 2013/0320080 A1* | 12/2013 | Olson ................... | H04W 76/10 235/380 |
| 2014/0009291 A1 | 1/2014 | Requist et al. | |
| 2014/0011286 A1 | 1/2014 | Potyrailo et al. | |
| 2014/0013865 A1 | 1/2014 | White et al. | |
| 2014/0055244 A1 | 2/2014 | Burchell et al. | |
| 2014/0079932 A1 | 3/2014 | Aksay et al. | |
| 2014/0327645 A1 | 11/2014 | Matthews et al. | |
| 2015/0073983 A1 | 3/2015 | Bartenstein et al. | |
| 2016/0070418 A1 | 3/2016 | Ogata | |

FOREIGN PATENT DOCUMENTS

| | | |
|---|---|---|
| CN | 104123644 | 10/2014 |
| DE | 102013103127 B3 | 5/2014 |
| EP | 2077484 | 7/2009 |
| EP | 2535840 A1 | 12/2012 |
| EP | 2535841 | 12/2012 |
| JP | 2006/164164 A | 6/2006 |
| JP | 2010/039896 A | 2/2010 |
| WO | WO 2008/050468 | 2/2010 |
| WO | WO 2011/053297 A1 | 5/2011 |
| WO | WO 2012/028748 A1 | 3/2012 |
| WO | WO 2012/172047 A1 | 12/2012 |
| WO | WO 2013/144788 A1 | 10/2013 |
| WO | WO 2014/174636 A1 | 10/2014 |

OTHER PUBLICATIONS

"TEMP-PLATE Irreversible Temperature Recording Labels", Wahl Instruments Inc., Retrived on Jan. 20, 2017, Webpage available at: http://www. palmerwahl.com/pdfs/TempPiate/.
"Thinfilm", Thinfilm, Retrieved on Jan. 25, 2017, Webpage available at : http://thinfilm.no/.
"Touchcode", T-ink, Retrieved on Jan. 18, 2017, Webpage available at : http://www.t-ink.com/products/touchcode/.
Allen et al., "Contactless Read-Out of Printed Memory", Microelectronic Engineering, vol. 88, No. 9, Sep. 2011, pp. 2941-2945.
Extended European Search Report received for corresponding European Patent Application No. 14179576.5, dated Jan. 21, 2015, 7 pages.
Extended European Search Report received for correspondings European Patent Application No. 14179588.0, dated Feb. 2, 2015, 11 pages.
International Search Report and Written Opinion received for corresponding Patent Cooperation Treaty Application No. PCT/FI2015/050504, dated Sep. 28, 2015, 13 pages.
International Search Report and Written Opinion received for corresponding Patent Cooperation Treaty Application No. PCT/FI2015/050514, dated Oct. 26, 2015, 14 pages.
Jung et al., "All-Printed and Roll-to-Roll-Printable 13.56-MHz-Operated 1-bit RF Tag on Plastic Foils", IEEE Transactions on Electron Devices, vol. 57, No. 3, Mar. 2010, pp. 571-580.
Kim et al., "Electrolyte-Gated Transistors for Organic and Printed Electronics", Advanced Materials, vol. 25, 2013, pp. 1822-1846.
Leppaniemi et al., "Roll-to-Roll Printed Resistive WORM Memory on a Flexible Substrate", Nanotechnology, vol. 23, No. 30, 2012, pp. 1-12.
Lipatov et al., "Highly Selective Gas Sensor Arrays Based on Thermally Reduced Graphene Oxide", Nanoscale, vol. 5, No. 13, Apr. 12, 2013, pp. 5426-5434.
Office Action for corresponding European Patent Application No. 14179576.5, dated Mar. 31, 2017, 4 pages.
Office Action for corresponding Japanese Application No. 2017-505092 dated Feb. 27, 2018.
Office Action for Japanese Application No. 2017-505092 dated Sep. 27, 2018.
Office Action for U.S. Appl. No. 15/329,715 dated May 11, 2018, 6 pages.
Office Action for U.S. Appl. No. 15/329,715 dated Sep. 11, 2017.
Office Action for U.S. Appl. No. 15/500,212 dated Jul. 31, 2018.
Office action received for corresponding European Patent Application No. 14179588.0, dated Oct. 12, 2017, 8 pages.
Saxena et al., "Vibrate-to-Unlock: Mobile Phone Assisted User Authentication to Multiple Personal RFID Tags", IEEE International Conference on Pervasive Computing and Communication (PerCom), Mar. 21-25, 2011, pp. 181-188.
Turke, Alexander et al, English Machine Translation of DE 10 2013 103 127 B3 of ABST, DESC and CLAIM, obtained on Jul. 26, 2018, pp. 1-37.
Kayashtha et al., "Ultrafast Integrated Humidity and Temperature Sensor Based on Carbon Nanotubes, and a Sensor Controller System", (2014), [online], [2014], retrieved from the internet <URL:https://briefs.techconnect.org/wp-content/volumes/Nanotech2014v1/pdf/722.pdf, (4 pages).
Yu et al., "TUIC: Enabling Tangible Interaction on Capacitive Multi-Touch Display", Proceedings of the SIGCHI Conference on Human Factors in Computing Systems, May 7-12, 2011, pp. 2995-3004.
Zhang et al., "Humidity-Sensing Properties of Chemically Reduced Graphene Oxide/Polymer Nanocomposite Film Sensor Based on Layer-by-Layer Nano Self-Assembly", Sensors and Actuators B: Chemical, vol. 197, Jul. 5, 2014, pp. 66-72.
Zirkl et al., "An All-Printed Ferroelectric Active Matrix Sensor network Based on Only Five Functional Materials Forming a Touchless Control Interface", Advanced Materials, vol. 23, No. 18, 2011, pp. 2069-2074.
Office Action for U.S. Appl. No. 15/500,212 dated Jan. 30, 2019.
Office Action for Japanese Application No. 2017-505092 dated Mar. 19, 219.
Notice of Allowance for U.S. Appl. No. 15/500,212 dated May 24, 2019.
Office Action for Chinese Application No. 201580053401.6 dated Jun. 5, 2019.
Intellectual Property Office of the P.R.C., Second Office Action received for Application No. 201580053401.6, dated Feb. 6, 2020, 8 pages, China.
Japan Patent Office, Notice of Rejection received for Application No. 2019-087972, dated Mar. 6, 2020, 9 pages, Japan.
Office Action for Japanese Application No. 2019-087972 dated Sep. 9, 2020, 4 pages.

* cited by examiner

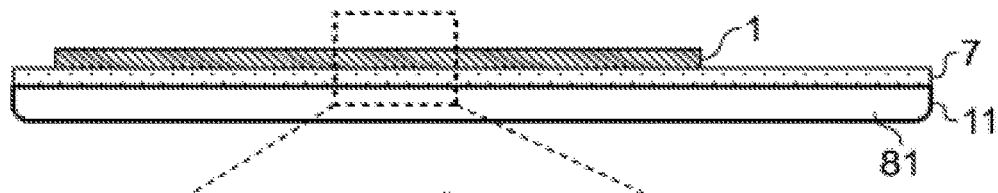
FIG. 1A
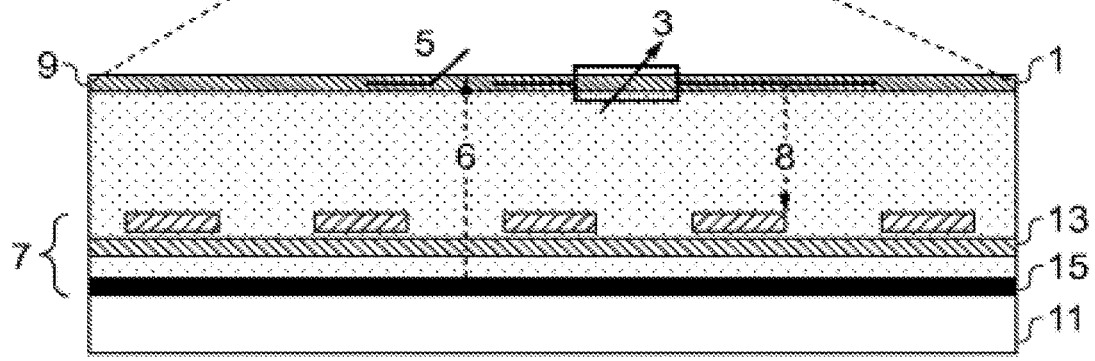
FIG. 1B
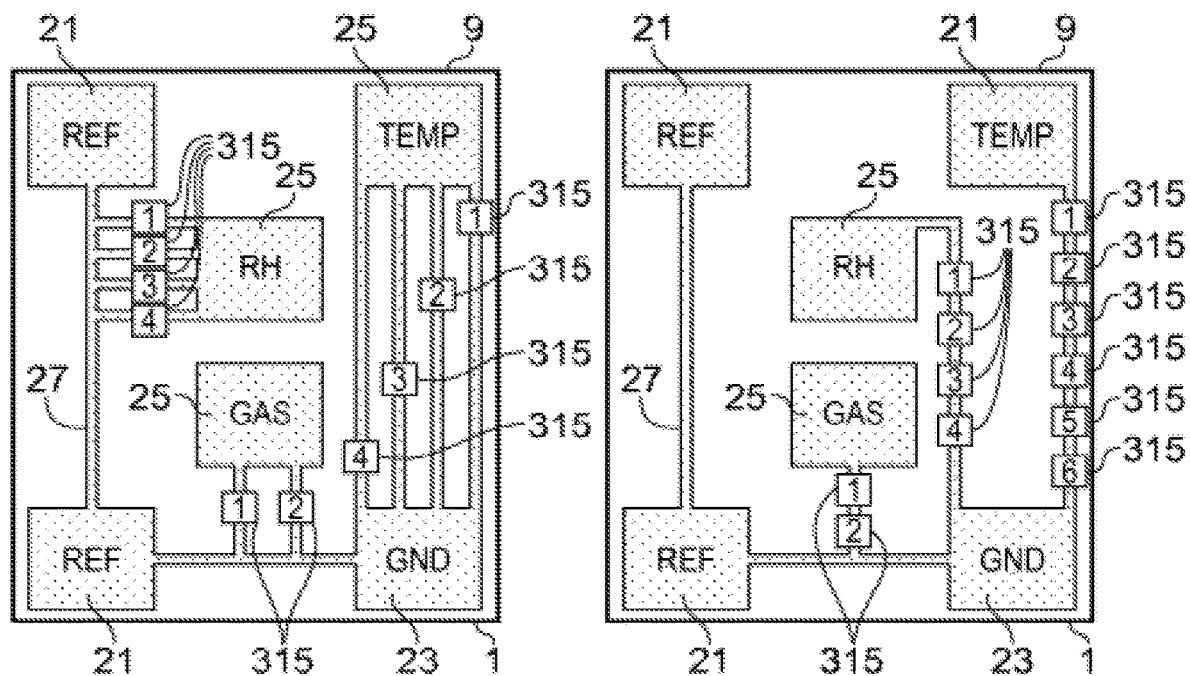
FIG. 2A
FIG. 2B

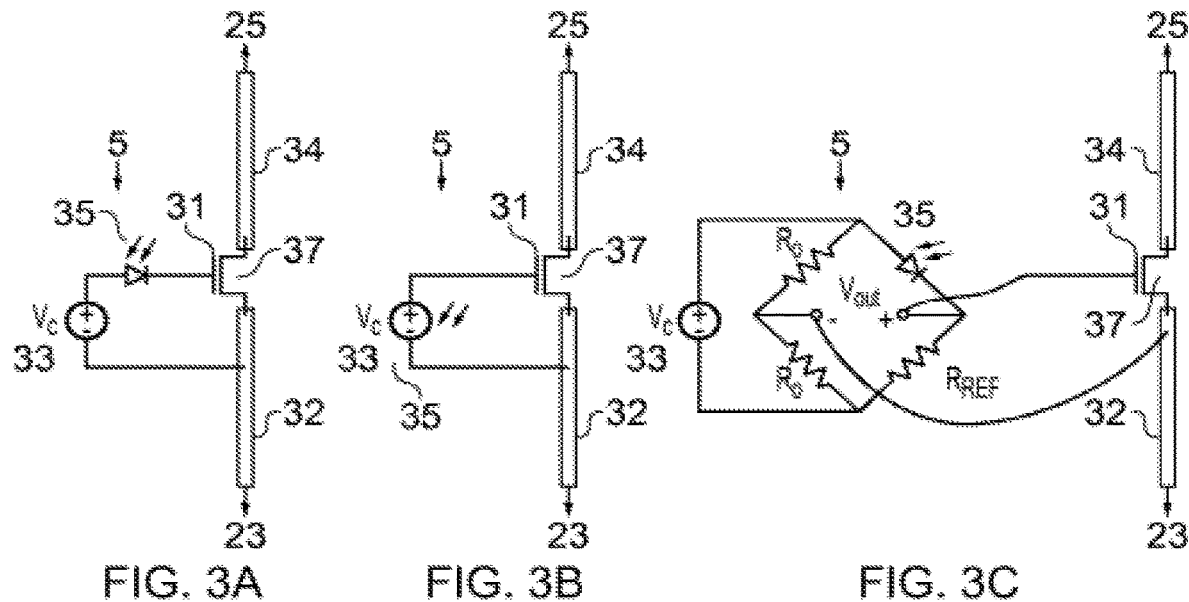
FIG. 3A   FIG. 3B   FIG. 3C
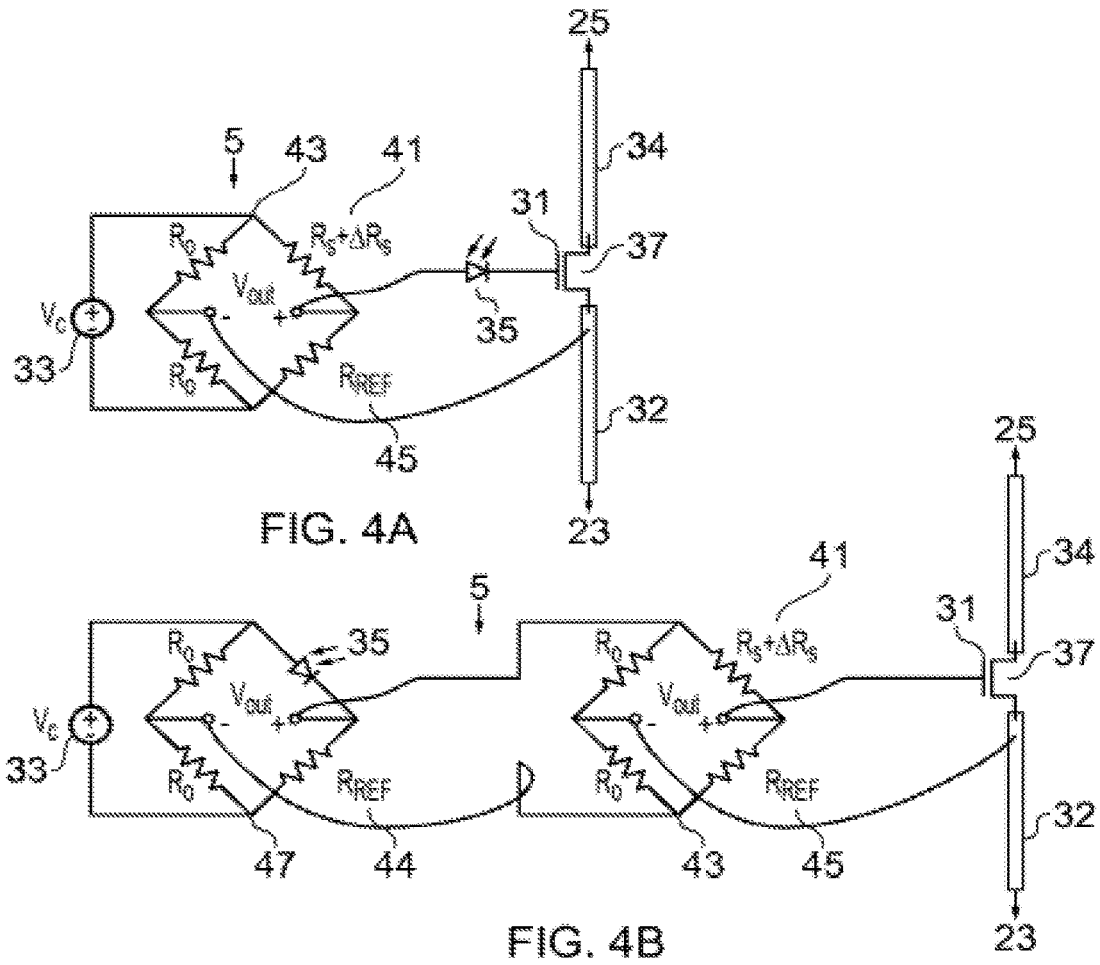
FIG. 4A
FIG. 4B

APPARATUS, METHODS AND COMPUTER PROGRAMS FOR ENABLING INFORMATION TO BE READ FROM AN APPARATUS

CROSS REFERENCE TO RELATED APPLICATIONS

This application is a continuation of U.S. patent application Ser. No. 15/329,715, filed Jan. 27, 2017, which is a national phase entry of International Application No. PCT/FI2015/050504, filed Jul. 16, 2015, which claims priority to EP Application No. 14179576.5, filed Aug. 1, 2014, the entire contents of which are incorporated herein by reference.

TECHNOLOGICAL FIELD

Examples of the present disclosure relate to apparatus, methods and computer programs for enabling information to be read from an apparatus. In particular, they relate to apparatus, methods and computer programs for enabling information to be read from a memory element provided in an identification tag or smart label.

BACKGROUND

Apparatus such as RFID (radio frequency identification) tags and NFC (near field communication) labels or other smart labels are known. Such apparatus may be attached to goods or other objects to enable the movement of the goods to be monitored. In some examples the tags and labels may comprise sensors which may also enable the environmental conditions of the goods or other objects to be monitored.

It is currently not possible to fabricate RFID tags and NFC labels solely by using cost-effective mass-printing methods because such tags and labels require complex circuitry to enable the data to be communicated between the tag or label and reader via modulation of an electromagnetic field.

Therefore it is useful to provide an apparatus which may be used as a tag or smart label and which can be manufactured using low cost techniques such as mass printing methods.

BRIEF SUMMARY

According to various but not necessarily all examples of the disclosure there may be provided an apparatus comprising: a memory element configured to store information; a switching element coupled to the memory element; wherein the switching element is configured to be switched from a first state to a second state in response to an input signal provided by a capacitive touch screen and wherein when the switching element is in the second state the information can be read from the memory element by the capacitive touch screen.

In some examples the memory element may be configured to store identification information.

In some examples the memory element may comprise a sensor element and may be configured to store information obtained by the sensor element.

In some examples the memory element and the switching element may be configured to enable an electrode to be connected and disconnected to ground.

In some examples the apparatus may comprise a plurality of memory elements and a plurality of switching elements.

In some examples the apparatus may be configured to be positioned adjacent to a capacitive touch screen.

In some examples the switching element may be configured to be switched from the first state to the second state by light emitted from the capacitive touch screen. A plurality of switching elements may be provided and different switching elements may be configured to be switched from the first state to the second state by different wavelengths of light.

In some examples the switching element may comprise a transistor and a switching component. The transistor may comprise an electrochemical transistor.

In some examples the apparatus may further comprise at least one reference electrode wherein the reference electrode is configured to enable the capacitive touch screen to determine the positions of the switching elements.

In some examples the apparatus may be transparent so that the data obtained by the capacitive touch screen may be displayed on the capacitive touch screen and viewed through the apparatus.

In some examples the apparatus may comprise a power supply.

According to various but not necessarily all examples of the disclosure there may be provided an identification tag comprising an apparatus as described above.

According to various but not necessarily all examples of the disclosure there may be provided a method comprising: providing a memory element configured to store information; coupling a switching element to the memory element; wherein the switching element is configured to be switched from a first state to a second state in response to an input signal provided by a capacitive touch screen and wherein when the switching element is in the second state the data can be read from the memory element by the capacitive touch screen.

In some examples the memory element may be configured to store identification information.

In some examples the memory element may comprise a sensor element and may be configured to store information obtained by the sensor element.

In some examples the memory element and the switching element may be configured to enable an electrode to be connected and disconnected to ground.

In some examples the method may further comprise providing a plurality of memory elements and a plurality of switching elements.

In some examples the method may further comprise providing the memory element and the switching element within an apparatus configured to be positioned adjacent to a capacitive touch screen.

In some examples the switching element may be configured to be switched from the first state to the second state by light emitted from the capacitive touch screen. A plurality of switching elements may be provided and different switching elements may be configured to be switched from the first state to the second state by different wavelengths of light.

In some examples the switching element may comprise a transistor and a switching component. The transistor comprises an electrochemical transistor.

In some examples the method may further comprise providing at least one reference electrode wherein the reference electrode is configured to enable the capacitive touch screen to determine the positions of the switching elements.

In some examples the memory element and the switching element may be provided within an apparatus and the apparatus is transparent so that the data obtained by the capacitive touch screen may be displayed on the capacitive touch screen and viewed through the apparatus.

In some examples the method may further comprise providing a power supply.

According to various but not necessarily all examples of the disclosure there may be provided an electronic device comprising: processing circuitry; and memory circuitry including computer program code; the memory circuitry and the computer program code configured to, with the processing circuitry, cause the electronic device at least to perform; detecting an apparatus overlaying a capacitive touch screen; determining a position of a switching element within the apparatus; activating the capacitive touch screen in a region underneath the switching element to enable data to be read from the apparatus.

In some examples the memory circuitry and the computer program code may be configured to, with the processing circuitry, cause the electronic device to determine a position of at least one reference electrode and use the position of the reference electrode to determine the position of the switching elements.

In some examples activating the capacitive touch screen may comprise activating pixels in the region of the capacitive touch screen underneath the switching element.

In some examples the memory circuitry and the computer program code may be configured to, with the processing circuitry, cause the electronic device to determine the position of a plurality of switching elements. The memory circuitry and the computer program code may be configured to, with the processing circuitry, cause the electronic device to activate the areas of the capacitive touch screen underneath a plurality of switching elements sequentially.

In some examples the memory circuitry and the computer program code may be configured to, with the processing circuitry, cause the electronic device to activate the areas of the capacitive touch screen underneath a plurality of switching elements simultaneously.

In some examples the memory circuitry and the computer program code may be configured to, with the processing circuitry, cause the electronic device to read data from the apparatus and enable the data to be displayed on the capacitive touch screen.

According to various but not necessarily all examples of the disclosure there may be provided a communications device comprising an electronics device as described above.

According to various but not necessarily all examples of the disclosure there may be provided a method comprising: detecting an apparatus overlaying a capacitive touch screen; determining a position of a switching element within the apparatus; activating the capacitive touch screen in a region underneath the switching element to enable data to be read from the apparatus.

In some examples the method may further comprise determining a position of at least one reference electrode and using the position of the reference electrode to determine the position of the switching elements.

In some examples activating the capacitive touch screen may comprise activating pixels in the region of the capacitive touch screen underneath the switching element.

In some examples the method may further comprise determining the position of a plurality of switching elements. In some examples the method may comprise activating the areas of the capacitive touch screen underneath a plurality of switching elements sequentially. In some examples the method may comprise activating the areas of the capacitive touch screen underneath a plurality of switching elements simultaneously.

In some examples the method may comprise reading data from the apparatus and enabling the data to be displayed on the capacitive touch screen.

According to various but not necessarily all examples of the disclosure there may be provided a computer program comprising computer program instructions that, when executed by processing circuitry, enable: detecting an apparatus overlaying a capacitive touch screen; determining a position of a switching element within the apparatus; activating the capacitive touch screen in a region underneath the switching element to enable data to be read from the apparatus.

According to various but not necessarily all examples of the disclosure there may be provided a computer program comprising program instructions for causing a computer to perform the method as described above.

According to various but not necessarily all examples of the disclosure there may be provided a physical entity embodying the computer program as described above.

According to various but not necessarily all examples of the disclosure there may be provided an electromagnetic carrier signal carrying the computer program as described above.

According to various, but not necessarily all, examples of the disclosure there may be provided examples as claimed in the appended claims.

BRIEF DESCRIPTION

For a better understanding of various examples that are useful for understanding the detailed description, reference will now be made by way of example only to the accompanying drawings in which:

FIGS. 1A and 1B illustrate an example apparatus and communication device;

FIGS. 2A and 2B illustrate example apparatus;

FIGS. 3A to 3C illustrate example switching elements;

FIGS. 4A and 4B illustrate example switching elements;

DETAILED DESCRIPTION

Figure 5:
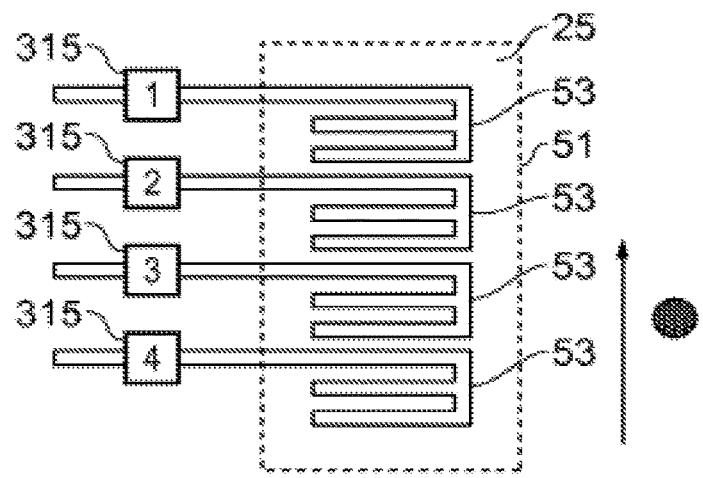
FIG. 5 illustrates an example apparatus.

The Figures illustrate an apparatus 1 comprising: a memory element 3 configured to store information 8; a switching element 5 coupled to the memory element 3; wherein the switching element 5 is configured to be switched from a first state to a second state in response to an input signal 6 provided by a capacitive touch screen 7 and wherein when the switching element 5 is in the second state the information 8 can be read from the memory element 3 by the capacitive touch screen 7.

The Figures also illustrate an electronic device 71 comprising: processing circuitry 73; and memory circuitry 75 including computer program code 76; the memory circuitry 75 and the computer program code 76 configured to, with the processing circuitry 73, cause the electronic device 71 at least to perform; detecting an apparatus 1 overlaying a capacitive touch screen 7; determining a position of a switching element 5 within the apparatus 1; activating the capacitive touch screen 7 in a region underneath the switching element 5 to enable information 8 to be read from the apparatus 1.

The apparatus 1 may be used to provide an identification tag or smart label. The apparatus 1 may be used to provide information 8 about goods or objects to which the apparatus 1 is attached. The information 8 could be identification information or information obtained by sensors or any other suitable information. The information 8 which is obtained by the sensors may provide an indication of the environmental conditions of the goods or objects. The electronic device 71 may be configured to control a capacitive touch screen 7 to read the information from the apparatus 1.

FIGS. 1A and 1B illustrate an example apparatus 1 and a communication device 81. FIG. 1A illustrates an example apparatus 1 overlaying a communication device 81. FIG. 1B illustrates a cross section through the apparatus 1 and the communication device 81.

The apparatus 1 may be an identification tag or smart label or any other suitable type of apparatus 1. The apparatus 1 may be configured to store information and enable the information to be read out using a capacitive touch screen 7. The apparatus 1 may be configured so that when the apparatus 1 is provided overlaying or adjacent to a capacitive touch screen 7, as illustrated in FIGS. 1A and 1B, the information stored in the apparatus 1 may be read out by the capacitive touch screen 7.

The apparatus 1 comprises a memory element 3 and a switching element 5. In some examples the apparatus 1 may comprise a plurality of memory elements 3 and switching elements 5.

The memory element 3 may comprise any means which may be configured to store information. In some examples the memory element 3 may be configured to store identification information.

In some examples the memory element 3 may comprise a sensor element. The sensor element may comprise any means which may be configured to detect a parameter and provide an output indicative of the detected parameter. The memory element 3 may be configured to store the information obtained by the sensor element.

The sensor element may comprise a material which may be configured to undergo a change in electrical properties in response to exposure to a parameter or combination of parameters. For example, the sensor element may be configured to become more conductive when it is exposed to parameters such as increased temperature or levels of humidity.

The memory element 3 may be coupled to the switching element 5. In some examples the memory element 3 may be coupled to the switching element so that a direct current path is provided between the memory element 3 and the switching element 5.

The switching element 5 may comprise any means which may be configured to be switched between a first state and a second state. In one of the states the switching element may have a high resistivity and in the other state the switching element may have a low resistivity. This may allow current to flow through the switching element in one state but not in the other state.

The switching element 5 may be configured to be switched from the first state to the second state in response to an input signal 6 provided by the capacitive touch screen 7. The input signal 6 may comprise light which may be emitted by the capacitive touch screen 7. In such examples the switching elements 5 may comprise a photo diode, a phototransistor, a light dependent resistor, a photoactive junction, a pyroelectric element or any other means which may be configured to undergo a change in resistivity in response to incident light.

In some examples the switching element 5 may be configured to be triggered by a specific wavelength or range of wavelengths of light. For instance the switching element 5 may be configured to be triggered in by red, green or blue light. In some examples different switching elements 5 within the same apparatus 1 may be configured to be triggered by different wavelengths of light. For instance a first switching element 5 may be triggered by red light, a second switching element 5 may be triggered by blue light and a third switching element 5 may be triggered by green light.

In other examples the switching element 5 may be configured to be switched from the first state to the second state in response to other parameters which may be generated by the capacitive touch screen 7 such as heat or any other suitable parameter which may be provided in an input signal from the capacitive touch screen 7.

The switching element 5 and the memory element 3 may be configured to enable a conductive electrode to be connected to or disconnected to ground. When the conductive electrode is connected to ground this may enable the electrode to be detected by the capacitive touch screen 7. This may enable information to be read from the apparatus 1 as described below.

In the examples of FIGS. 1A and 1B the apparatus 1 comprises a flat or substantially flat substrate 9. The memory elements 3 and the switching elements 5 of the apparatus 1 may be printed on the substrate 9. As the substrate 9 is flat or substantially flat this enables the apparatus 1 to be placed over the surface of a capacitive touch screen 7. This may also enable the apparatus 1 to be easily attached to goods or other objects. It is to be appreciated that in other examples the apparatus 1 may have a different shape, for example, the apparatus 1 may be flexible which may enable it to be deformed by a user.

In some examples the apparatus 1 may comprise means for attaching the apparatus 1 to goods or the packaging of goods. For example the apparatus 1 may comprise an adhesive label or any other suitable means which enables the apparatus 1 to be adhered to another item. In other examples the apparatus 1 may be printed directly onto the goods or the packaging of the goods. This may enable the apparatus 1 to be used to monitor the movement and/or environmental conditions of the goods.

The communication device 81 comprises a housing 11 and a capacitive touch screen 7. The communication device 81 controlling circuitry which may be as described below with reference to FIGS. 7 and 8. The housing 11 may be configured to store the controlling circuitry and other electronic components of the communication device 81. The capacitive touch screen 7 may form part of the housing 11 so that the capacitive touch screen 7 forms part of the outer surface of the communication device 81.

The capacitive touch screen 7 may comprise a display 15 and a sensor array 13. The display 15 and sensor array 13 may be as described below with reference to FIG. 9.

When the apparatus is provided overlaying or adjacent to the capacitive touch screen 7 the capacitive touch screen 7 may be configured to activate the areas of the display 15 underneath the switching elements 5 of the apparatus 1. The display 15 may be activated by illuminating one or more pixels which are positioned underneath the switching element 5. Pixels which are not positioned underneath the switching element 5 may be turned off. This generates an input signal 6 which may be detected by the switching element 5. The input signal 6 may cause the switching element 5 to be switched from a first state to a second state. This may enable one or more electrodes to be connected to or disconnected from ground. This may be detected by the capacitive touch screen 7 and may enable information 8 stored in the apparatus 1 to be read by the capacitive touch screen 7.

FIGS. 2A and 2B schematically illustrate example apparatus 1. The example apparatus 1 comprises a plurality of electronic components which may be printed on a substrate 9. The electronic components may comprise one or more reference electrodes 21, a ground node 23, one or more active electrodes 25 and a plurality of memory elements 3 and switching elements 5. For clarity in FIGS. 2A and 2B the memory elements 3 and switching elements 5 are illustrated as a single component. Examples of switching elements 5 and memory elements 3 which may be used are illustrated in FIGS. 3A to 4B and described below.

In the examples of FIGS. 2A and 2B the apparatus 1 may be a smart label which may be configured to enable the environmental conditions of goods and other objects to which the apparatus 1 is attached be monitored. In the examples of FIGS. 2A and 2B the apparatus 1 is configured to sense the parameters of relative humidity, temperature and gas. The memory elements 3 may comprise sensor elements which may be configured to detect the respective parameters.

In some examples the apparatus 1 may also comprise one or more identification nodes. In such examples the memory elements 3 which are coupled to the identification nodes need not comprise any sensor elements.

The reference electrodes 21 may provide means for enabling a capacitive touch screen 7 to determine the positions of the switching elements 5.

The reference electrodes 21 and the ground node 23 may comprise portions of conductive material. The portions of conductive material may be sized so that the conductive region can be detected by the capacitive touch screen 7. The reference electrodes 21 may be connected to the ground node 23. The reference electrodes 21 may be connected to the ground node 23 by a conductive wire or trace 27. The conductive wire or trace 27 may provide a direct current path between the reference electrodes 21 and the ground node 23.

In the examples of FIGS. 2A and 2B the reference electrodes 21 and the ground node 23 are permanently connected to ground. There are no switching elements 5 or sensor elements provided between the reference electrodes 21 and the ground node 23. This enables the capacitive touch screen 7 to detect the positions of the reference electrodes 21 without having to trigger a switch 5.

In the examples of FIGS. 2A and 2B the reference electrodes 21 and the ground node 23 are provided in the corners of the apparatus 1. It is to be appreciated that the reference electrodes 21 and the ground node 23 may be provided in other positions in other examples of the disclosure.

In the examples of FIGS. 2A and 2B two reference electrodes 21 and a ground node 23 are provided. It is to be appreciated that other numbers of reference electrodes 21 may be provided in other examples of the disclosure.

In the examples of FIGS. 2A and 2B the apparatus 1 also comprises a plurality of active electrodes 25. In the example of FIGS. 2A and 2B three active electrodes 25 are provided. Each of the active electrodes 25 are associated with a parameter which may be sensed by one or more sensor elements. The sensor elements may be provided within the memory elements 3 which are coupled to the respective active electrodes 25.

In the example of FIGS. 2A and 2B the active electrodes 25 are associated with the parameters of temperature, relative humidity and gas. It is to be appreciated that in other examples the active electrodes 25 may be associated with different parameters. In the examples of FIGS. 2A and 2B each of the active electrodes 25 are associated with a different parameter. In some examples one or more of the active electrodes 25 may be associated with the same parameter.

The active electrodes 25 may comprise portions of conductive material. The portions of conductive material may be sized so that the conductive region of the active electrode 25 can be detected by a capacitive touch screen 7. One or more conductive traces or wires 27 may be provided between the active electrodes 25 and the ground node 23. The active electrodes 25 may be connected or disconnected to the ground node 23 depending on whether or not the switching element 5 is in a first state or a second state and whether or not the sensor elements within the memory elements 3 have sensed a parameter.

In both the examples of FIGS. 2A and 2B a plurality of switching elements 5 and memory elements 3 are coupled to each of the active electrodes 25.

In the example of FIG. 2A the plurality of switching elements 5 and memory elements 3 are arranged in parallel. In FIG. 2A a plurality of conductive traces or wires 27 are provided between each of the active electrodes 25 and ground. A single switching element 5 or memory element 3 may be provided in each of the conductive traces or wires 27.

In the example of FIG. 2A the switching elements 5 may be configured to have a high resistivity when the switching elements 5 are in the first state in which the input signal 6 from the capacitive touch screen 7 is not provided. This may prevent current flowing from the active electrode 25 to the ground node 23 when the switching elements 5 are not activated. In such examples the switching elements 5 may comprise organic thin film transistors (OTFT) or any other suitable means.

When the switching elements 5 are activated by the light from the capacitive touch screen 7 this switches the switching element 5 to the second state. In the second state the switching element 5 has a low resistivity so the switching element allows current to flow between the active electrode 25 and the ground node 23 if the sensor element is above a threshold value.

In the example of FIG. 2B the plurality of switching elements 5 are arranged in series. In FIG. 2B a single conductive trace or wire 27 is provided between each of the active electrodes 25 and ground. A plurality of switching elements 5 and memory elements 3 may be provided in each of the conductive traces or wires 27. Each of the memory elements 3 may comprise a sensor element which has a different sensitivity to a given parameter.

In the example of FIG. 2B the switching elements 5 may be configured to have a low resistivity when the switching elements 5 are in the first state in which the input signal 6 from the capacitive touch screen 7 is not provided. This may allow current to flow from the active electrode 25 to the ground node 23 when the switching elements 5 are not activated. In such examples the switching elements 5 may comprise electrochemical transistors (ECTs) or any other suitable means.

When the switching elements 5 are activated by the light from the capacitive touch screen 7 this switches the switching element 5 to the second state. In the second state the switching element 5 has a high resistivity so the switching element prevents current from flowing between the active electrode 25 and the ground node 23 if the sensor element is above a threshold value.

Therefore by actuating each of the switching elements 5 individually the capacitive touch screen 7 can read out information from the apparatus 1 by detecting whether or not the active electrodes 25 are connected to ground when the respective switch elements 5 are actuated.

In some examples the capacitive touch screen 7 may be configured to read each of the switching elements 5 sequentially so that the capacitive touch screen 7 may activate one of the switching elements 5 at a time. In some examples one or more of the switching elements may be configured to be activated simultaneously. For instance when switching elements 5 are connected to different active electrode 25 they may be activated simultaneously. This may enable the capacitive touch screen 7 to read information 8 associated with plurality of active electrodes 25 at the same time.

In the examples of FIGS. 2A and 2B the switching elements 5 must be spaced sufficiently far apart to prevent the wrong switching elements 5 from being activated when the pixels of display 15 are turned on. In some examples the switching elements 5 may be spaced from each other by a distance of around 1 mm. It is to be appreciated that the spacing between the switching elements 5 may be depend upon the wavelength of the light which is used to trigger the switching elements 5.

In some examples the switching elements 5 may be configured so that they are only switched between the first and second state in response to light having a particular wavelength. In such examples adjacent switching elements 5 may be configured to be triggered by different wavelengths or ranges of wavelengths of light. In such examples when the capacitive touch screen 7 activates the display 15 underneath the switching element 5 the display 15 may be configured so that only the pixels corresponding to the correct wavelength of light are activated. For instance if the switching element 5 is configured to be triggered by green light then only the green pixels need to be illuminated. This may prevent the wrong switching element 5 being activated and may allow the switching elements 5 to be positioned closer together on the apparatus 1.

In some examples the apparatus 1 may be provided with a matt black finish. The matt black finish may be configured to absorb stray light and reduce the likelihood of the wrong switching elements 5 being activated.

FIGS. 3A to 3C schematically illustrate example switching elements 5 which may be used in example apparatus 1. The examples of FIGS. 3A to 3C show a binary bit switching element 5.

In FIGS. 3A to 3C the switching elements 5 comprise a switching component 35 and a transistor 37. The switching component 35 may comprise any means which may be configured to be triggered by the input signal 6 from the capacitive touch screen 7. In FIGS. 3A and 3C the switching component 35 comprises photodiode or photo transistor. In FIG. 3B the switching component 35 comprises a pyroelectric component or a photoactive junction, which can generate a voltage when illuminated.

In the examples of FIGS. 3a to 3C a power source 33 is provided. The power source 33 may comprise any suitable means. The power source 33 may comprise a battery, a photo electric device which may be configured to provide a voltage when illuminated or any other suitable means.

Each of the switching components 35 of FIGS. 3A to 3C is connected to a gate electrode 31 of the transistor 37. The transistor 37 may be connected between a ground electrode 23 and an active electrode 25. In the examples of FIGS. 3A to 3C a first conductive trace 32 provides a connection to the ground electrode and a second conductive trace 34 provides a connection to the active electrode 25. In the example of FIG. 2B a plurality of switching elements 5 may be connected in series and so there may be other switching elements 5 connected between the transistor 37 and the ground electrode 23 and/or the active electrode 25.

The switching element 5 is configured so that when an input signal 6 is obtained from a capacitive touch screen 7 this will enable a voltage to be provided to the gate electrode 31 in dependence on the state of the switching component 35. If the switching component 35 connects the gate electrode 31 to the power supply 33 then a voltage is provided between the gate electrode 31 and the source and the transistor 37 is switched on. If the switching component 35 does not connect the gate electrode 31 to the power supply 33 then a voltage is not provided between the gate electrode 31 and the source and the transistor 37 remains off.

In examples where the transistor 37 comprises an electrochemical transistor the electrochemical transistor is in an on state when the no voltage is provided between the gate electrode 31 and the source. In such examples the situation as described above would be reversed so that if the switching component 35 connects the gate electrode 31 to the power supply 33 then a voltage is provided between the gate electrode 31 and the source and the transistor 37 is switched off. If the switching component 35 does not connect the gate electrode 31 to the power supply 33 then a voltage is not provided between the gate electrode 31 and the source and the transistor 37 is switched on.

The examples of FIGS. 3A to 3C provide binary bit switching elements 5. The switching elements may be in one of two states depending on whether or not the capacitive touch screen 7 has triggered the photo detector. Such switching elements 5 may be suitable for use in ID tags or other types of apparatus 1.

FIGS. 4A and 4B schematically illustrate example switching elements 5 which comprise one or more sensor elements 41. The switching elements 5 comprises a power source 33, a switching component 35 and a transistor 37 which may be as described above in relation to FIGS. 3A to 3C. The transistor 37 may be connected between a ground electrode 23 and an active electrode 25 as described above.

In the examples of FIGS. 4A and 4B the sensor elements 41 may comprise any material which changes resistance in response to a sensed parameter. In the examples of FIGS. 4A and 4B the sensor element 41 is provided in a Wheatstone bridge arrangement 43. The Wheatstone bridge arrangement will only provide a voltage at its output ($V_{out}$) when the resistance of the sensor element 41 deviates from the resistance of the reference resistor 45.

In the examples of FIGS. 4A and 4B the switching components 35 may comprise a photoactive component.

In the examples of FIGS. 4A and 4B the resistance between the two conductive traces 32 and 34 will only switch between the low resistance and high resistance states when the switching component has been actuated by the input signal 6 from the capacitive touch screen 7 and when the Wheatstone bridge arrangement provides a voltage $V_{out}$.

In the example of FIG. 4A the switching component 35 comprises a photodiode which may be configured to drop in resistance when illuminated. The allows the voltage $V_{out}$ to be coupled to the gate electrode 31 and allows the transistor 37 to be switched between an on and off states.

In the example of FIG. 4B the switching component 35 is provided within a second Wheatstone bridge arrangement 47. The switching component 35 comprises a photodiode which may be configured to change in resistance when illuminated. This will cause the resistance of the switching component 35 to deviate from the resistance of the reference resistor 45 and enable the second Wheatstone bridge arrangement 47 to provide a voltage to the first Wheatstone bridge arrangement 43. If the resistance of the sensor element 41 also deviates from the reference electrode 45 then the voltage $V_{out}$ will be coupled to the transistor 37.

FIG. 5 illustrates an example of how the apparatus 1 in FIG. 2A could be configured. In particular the example of FIG. 5 shows how the relative humidity active electrode 25 could be detected. It is to be appreciated that this could be used with any of the active electrodes 25

The relative humidity active electrode 25 is indicated by the dashed line 51. In the example of FIG. 5 the relative humidity active electrode 25 comprises four electrodes 53. Each of the four electrodes 53 is connected to a switching element 5 and memory element 3.

Each of the sensor elements 41 within the memory elements 3 may have a different sensitivity to relative humidity. This will cause each of the sensor elements 41 to be switched on at different stages of exposure to relative humidity. In other examples the sensor elements may be configured to detect other parameters such as temperature, gas or any other parameter. In such examples each of the sensor elements may have a different sensitivity to the parameter which is to be sensed.

In some examples the switching elements 5 may all be triggered simultaneously. This may enable more than one of the electrodes 53 to be connected to ground at the same time. The capacitive touch screen 7 may be configured to determine which of the sensor elements 41 have been triggered by determining the position of the detected touch location.

As the apparatus 1 is exposed to more relative humidity more of the sensor elements 41 will be turned on. For instance, in the example of FIG. 5 when the apparatus 1 is exposed to low levels of humidity only the first sensor element 41 will be actuated. As the apparatus 1 is exposed to humidity for a longer period of time each of the sensor elements 2, 3 and 4 will become actuated in turn. As more of the sensor elements 41 are turned on each of the electrodes 53 become connected to ground in turn. The will cause the position of the conductive portion as detected by the capacitive touch screen 7 to move upwards as indicated by the arrow in FIG. 5.

In other examples the switching elements 5 may be triggered individually to determine which sensor elements 41 have been turned on. In such examples the position of the individual electrodes 53 may be detected by the capacitive touch screen 7.

The configuration of FIG. 5 may allow for a higher resolution of the parameters to be detected as different sensor elements may be triggered by different levels of exposure to a parameter.

Although the example of FIG. 5 refers to the relative humidity active electrode 25 it is to be appreciated that the arrangement could be used to detect any suitable parameter. Similarly although four switching elements 5 and memory elements 3 are illustrated in FIG. 5 any number of switching elements 5 and memory elements 3 may be used in other examples.

Figure 6:
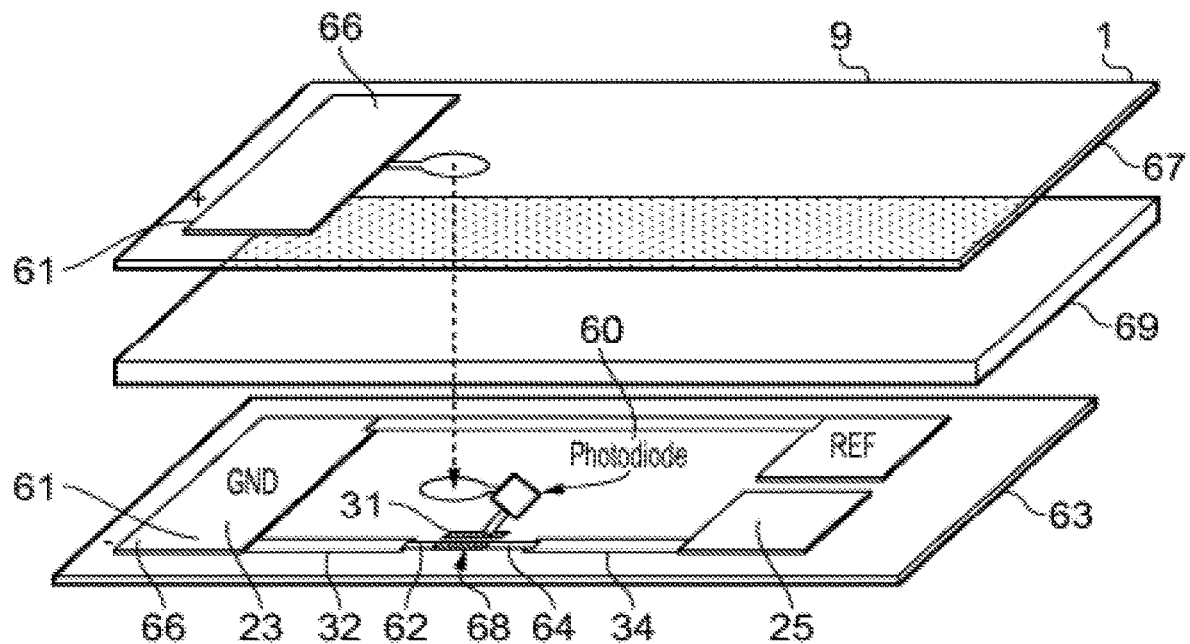
FIG. 6 illustrates an example apparatus.

FIG. 6 illustrates an example apparatus 1 which may be used in some examples. The apparatus 1 may be as described above in relation to FIGS. 1 to 5. The apparatus of Fig. has been simplified to include only one photodiode and one electrochemical transistor. The apparatus 1 may comprise one or more memory elements 3 and switching elements 5 as described above.

The apparatus 1 of FIG. 6 may be formed using any suitable methods such as printing or lamination.

The apparatus 1 comprises a flat or substantially flat substrate 9. The substrate 9 may be a laminar substrate 9. The substrate 9 may comprise a plurality of layers. In the example of FIG. 6 the substrate 9 comprises three layers. The substrate 9 comprises a first flexible layer 63 and a second flexible layer 67 and a layer of electrolyte 69. It is to be appreciated that in other examples the substrate 9 may comprise any number of layers.

The flexible layers 63, 67 may comprise any means upon which the electronic components of the apparatus 1 may be printed. The flexible layers 63, 67 may then be adhered together to form an apparatus 1. In some examples the electronic components may be printed on the flexible layers 63, 67 so that the electronic components are provided inside of the apparatus 1. This may prevent the electronic components from being damaged.

Any suitable materials may be used for the flexible layers 63, 67. Examples of materials which may be uses comprises Polyethylene 2, 6-naphthalate (PEN). Polyethylene Terephthalate (PET), Polyimide (PI), Polycarbonate (PC), Polyethylene (PE), Polyurethane (PU), Polymethylmethacrylate (PMMA), Polystyrene (PS), natural rubbers such as; Polyisoprenes, Polybutadienes, Polychloraprenes, Polyisobutylenes, Nitrile Butadienes and Styrene Butadienes, saturated elastomeric materials such as; Polydimethylsiloxane (PDMS), Silicone rubbers, Fluorosilicone rubbers, Fluoroelastomers, Perfluoroelastomers, Ethylene Vinyl Acetate (EVA) Thermoplastic Elastomers such as Styrene Block copolymers, Thermoplastic polyolefins, Thermoplastic vulcanisates, Thermoplastic Polyurethane (TPU) Thermoplastic Copolyesters, Melt processable rubbers. Metal foils may also be used, in particular planarised metal foils on which TFT's and displays can be created.

In some examples the flexible layers 63, 67 of the substrate 9 may also be flexible displays such as Organic Light Emitting Diodes (OLED), Liquid Crystal (LCD), Polymer Dispersed Liquid Crystal (PDLC) or other reflective LCD display, ElectroPhoretic (EP), Electroluminescent (EL), Electrowetting (EW) Electrochromic (EC), or other optical modulation effects such as Interference based on frustrated internal reflection or Fabry Perot cavities.

The apparatus 1 of FIG. 6 comprises a power source 61. The power source 61 may comprise any means which may be configured to provide power to the apparatus 1 or the electrical components within the apparatus 1. In the example of FIG. 6 the power source 61 comprises a supercapacitor or battery. In other examples the power source 61 may comprise, a capacitor, an energy harvesting device or any other suitable means.

In the example of FIG. 6 the power source 61 comprise two electrodes 66. The first electrode 66 of the power source 61 is printed on the first flexible layer 63 and the second electrode 66 is printed on the second flexible layer 67. In examples where the power source 61 comprises a supercapacitor then the electrodes 66 may be formed by printing a layer of charge collector and then printing the electrodes 66 over the charge collector. The charge collector may comprise a film of a conductive metal such as silver, copper, aluminium or any other suitable material. The electrodes 66 may comprise any suitable material such as activated carbon, carbon fibre, carbon nanotubes or any other suitable material.

In examples where the power source 61 comprises a battery such as a lithium ion battery. The electrodes may be formed by printing a layer of charge collector and then printing the electrodes 66 over the charge collector. The charge collector may comprise a film of conductive metal such as silver, copper, aluminium or any other suitable material. A first electrode 66 may comprise printed $LiFeO_4$ or $LiCoO_2$ and the second electrode 66 may comprise printed graphite. Other materials may be used in other examples of the disclosure.

In the example of FIG. 6 the electrode 66 of the power source 61 which is provided on the lower flexible layer 63 may also be used as the ground node 23. One or more reference electrodes 21 may be connected to the reference node 23 as described above. The reference nodes 21 and conductive traces or wires 25 may be printed on the flexible layer 63 using any suitable means. The material which is used for the reference nodes 21 and conductive traces or wires 25 may comprise any suitable conductive material such as indium tin oxide. In some examples the conductive material may comprise a transparent conductive material.

In the example of FIG. 6 the apparatus 1 comprise an electrochemical transistor 68. The apparatus of FIG. 6 can incorporate several switching elements 5 in which case the apparatus 1 may comprise a plurality of electrochemical transistor 68.

The electrochemical transistor 68 may comprise source 62 and drain electrodes 64 and a gate electrode 31. The gate electrode 31 may be connected to a switching component 35 as described above in relation to FIGS. 3A to 4B. In the example of FIG. 6 the source electrode 62 is connected to ground 25 by a first conductive trace 32 and the drain electrode 34 is connected to an active electrode 25 by a second conductive trace.

The electrodes 31, 62, 64 may comprise carbon or any other suitable material. The electrodes 31, 62, 64 may be printed on the lower flexible layer 31, 62, 64. In the example of FIG. 6 both the electrodes 31, 62, 64 comprise PEDOT:PSS (Poly(3,4-ethylenedioxythiophene) Polystyrene sulfonate). The PEDOT:PSS may be printed on the flexible layer 63. Other materials may be used in other examples of the disclosure.

The apparatus of FIG. 6 also comprises a photodiode 60. The photodiode 60 may comprise any suitable material such as organic or nanowire or quantum dot based materials. The photodiode 60 may be printed on the flexible layer 63.

In addition to the electronic components illustrated in FIG. 6 the apparatus 1 may also comprise additional electronic components such as sensing elements 41 and switching elements 5 as described above. The additional electronic components may be printed using any suitable technique and any suitable material.

Some or all of the electronic components may be covered with a dielectric material. The dielectric material may be configured to prevent short circuits within the apparatus 1.

The two flexible layers 63, 67 may be adhered together by a layer of electrolyte 69. The electrolyte 69 may be configured to solidify at room temperature. In some examples the electrolyte 69 may be provided in a continuous layer. In such examples the same electrolyte 69 may be provided within the power source 61 and the electrochemical transistor 68. In other examples the electrolyte 67 may be patterned according to the circuitry. In such examples a different electrolyte may be provided within the power source 61 and the electrochemical transistor 68.

The electrolyte may comprise any suitable material such as $PVA/H_3Po_4$ (Poly vinyl acetate/phosphoric acid) or $PVA/H_2SO_4$ (Poly vinyl acetate/sulfate acid) gel electrolyte or any other suitable electrolyte.

A via may be provided to connect the top electrode 66 of the power source 61 to the circuitry on the bottom flexible layer 63.

In some examples of the apparatus 1 the switching element 5 may comprise a photovoltaic detector such as an organic photovoltaic detector.

The organic photodetector may comprise a top layer. The top layer may comprise transparent material such as a transparent flexible polymer. The top layer may be coated with a barrier material. The barrier material may be configured to prevent moisture or oxygen ingress to the photovoltaic detector. The barrier material may improve the lifetime of the photovoltaic detector.

The photovoltaic detector may also comprise an anode layer, a light sensitive layer, a hole transport layer and a cathode layer. The anode layer may comprise a conductive layer which may be configured to extract electrons from the light sensitive layer. The light sensitive layer may comprise a material in which electron and hole pairs are generated by incident photons. The hole transport layer may be configured to extract electron holes from the light sensitive layer and provide the holes to the conductive cathode layer. A bottom layer may be provide so that the bottom layer and the top layer encapsulate the photovoltaic detector.

The organic photovoltaic detector may be fabricated using any suitable method such as roll-to-roll processing as follows. The roll-to-roll processing may comprise patterning of a conductive material such as indium tin oxide (ITO) on plastic substrate by printing etching paste. Gravure printing may be used to fabricate PEDOT:PSS and photoactive layers and evaporation may be used to fabricate the top electrode.

In some examples of the disclosure organic photovoltaic detector may be used as the switching elements within the apparatus 1. In such examples, both the anode for the organic photovoltaic detector as well as the reference electrodes 21 may be patterned from indium tin oxide (ITO) or another transparent conducting material. Similarly, the PEDOT:PSS printing can be carried out for both the organic photovoltaic detector and for the ECTs at the same time.

In some examples the photodetector may comprise a hybrid graphene-quantum dot photodetector. In such examples, the substrate material supporting the apparatus may comprise $SiO_2$ or a flexible insulating material such as a flexible transparent polymer. The hybrid graphene-quantum dot photodetector may comprise a carbon-based charge transport layer. In such examples the transparent conductors may comprise graphene, reduced graphene oxide or carbon nanotubes (CNTs) as the transparent conductor.

In some examples the light sensitive layer within the photodetector may be 70-300 nm thick. The light sensitive layer maybe either an n-type or p-type, or a mixture of both materials. Examples of p-type materials comprise materials such as polythiophene, polypyrrole, polyaniline, polyfluorene, polyphenylene vinylene, polyphenylene. Examples of n-type materials comprise materials such as fullerenes, dithieno [3, 2-b:2', 3'-d]pyrrole (DTP), poly($^1$ubstituted dithieno [3, 2-b: 2', 3'-d]pyrrole)s (PDTPs).

Figure 7:
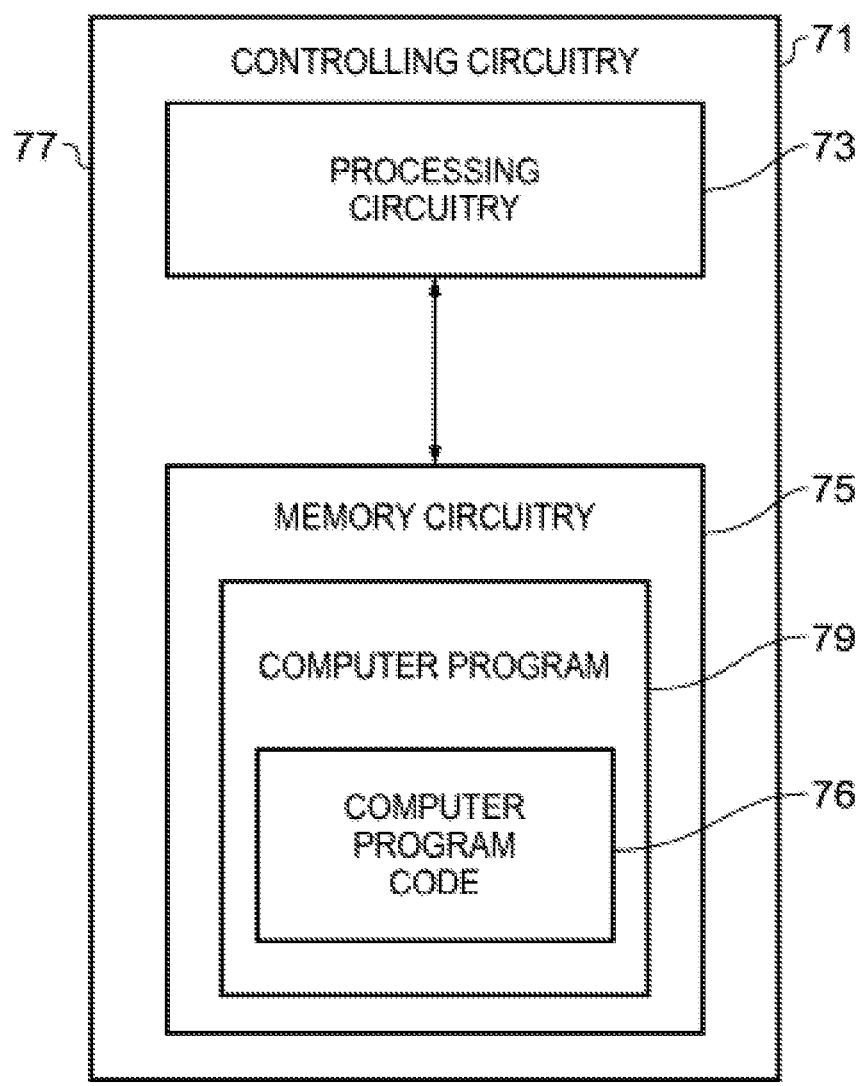
FIG. 7 illustrates an example electronic device.

FIG. 7 illustrates an example electronic device 71 which may be used to control a capacitive touch screen 7. The electronic device 71 may be configured to control the capacitive touch screen 7 to read information 8 from an apparatus 1 as described above.

The electronic device 71 may be, for example, a chip or chip set. The electronic device 71 of FIG. 7 may be provided within a communications device, such as a mobile telephone, a tablet computer or any other electronic device which may comprise a user input device such as a capacitive touch screen.

The electronic device 71 comprises controlling circuitry 77. In the illustrated example the controlling circuitry 77 comprises processing circuitry 73 and memory circuitry 75.

The controlling circuitry 77 provides means for controlling the electronic device 71. The controlling circuitry 77 may provide means for controlling a communications device. The controlling circuitry 73 may be implemented using instructions that enable hardware functionality, for example, by using executable computer program instructions 76 in one or more general-purpose or special-purpose processing circuitry 73 that may be stored on a computer readable storage medium 74 (e.g. disk, memory etc.) to be executed by such processing circuitry 73.

The controlling circuitry 77 may be configured to enable the electronic device 71 to detect an apparatus 1 overlaying a capacitive touch screen 7; determine a position of a switching element 5 within the apparatus 1; activate the capacitive touch screen 7 in a region underneath the switching element 5 to enable data to be read from the apparatus 1.

The processing circuitry 73 may also be configured to write to and read from the memory circuitry 75. The processing circuitry 73 may also comprise an output interface via which data and/or commands are output by the processing circuitry 73 and an input interface via which data and/or commands are input to the processing circuitry 73.

The memory circuitry 75 may be configured to store a computer program 79 comprising computer program instructions 76 (computer program code) that controls the operation of the electronic device 71 when loaded into the processing circuitry 73. The computer program instructions 76 may provide the logic and routines that enable the electronic device 71 to perform the example methods illustrated in FIG. 10. The processing circuitry 73 by reading the memory circuitry 75 may be able to load and execute the computer program 79.

The computer program instructions 76 may provide computer readable program means configured to control the electronic device 71. The computer program instructions 76 may provide, when loaded into the processing circuitry 73; means for detecting an apparatus 1 overlaying a capacitive touch screen 7; means for determining a position of a switching element 5 within the apparatus 1; means for activating the capacitive touch screen 7 in a region underneath the switching element 5 to enable data to be read from the apparatus 1.

The computer program 79 may arrive at the electronic device 71 via any suitable delivery mechanism 72. The delivery mechanism 72 may be, for example, a computer-readable storage medium, a computer program product 74, a memory device, and a record medium such as a CD-ROM or DVD, an article of manufacture that tangibly embodies the computer program 79. The delivery mechanism may be a signal configured to reliably transfer the computer program 79. The electronic device 71 may propagate or transmit the computer program 79 as a computer data signal.

Although the memory circuitry 75 is illustrated as a single component in FIG. 7 it may be implemented as one or more separate components some or all of which may be integrated/removable and/or may provide permanent/semi-permanent/dynamic/cached storage.

Although the processing circuitry 73 is illustrated as a single component in FIG. 7 it may be implemented as one or more separate components some or all of which may be integrated/removable.

References to "computer-readable storage medium", "computer program product", "tangibly embodied computer program" etc. or a "controller", "computer", "processor" etc. should be understood to encompass not only computers having different architectures such as single/multi-processor architectures and sequential (e.g. Von Neumann)/parallel architectures but also specialized circuits such as field-programmable gate arrays (FPGA), application specific integration circuits (ASIC), signal processing devices and other devices. References to computer programs, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term "circuitry" refers to all of the following:
(a) hardware-only circuit implementations (such as implementations in only analog and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and
(c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

Figure 8:
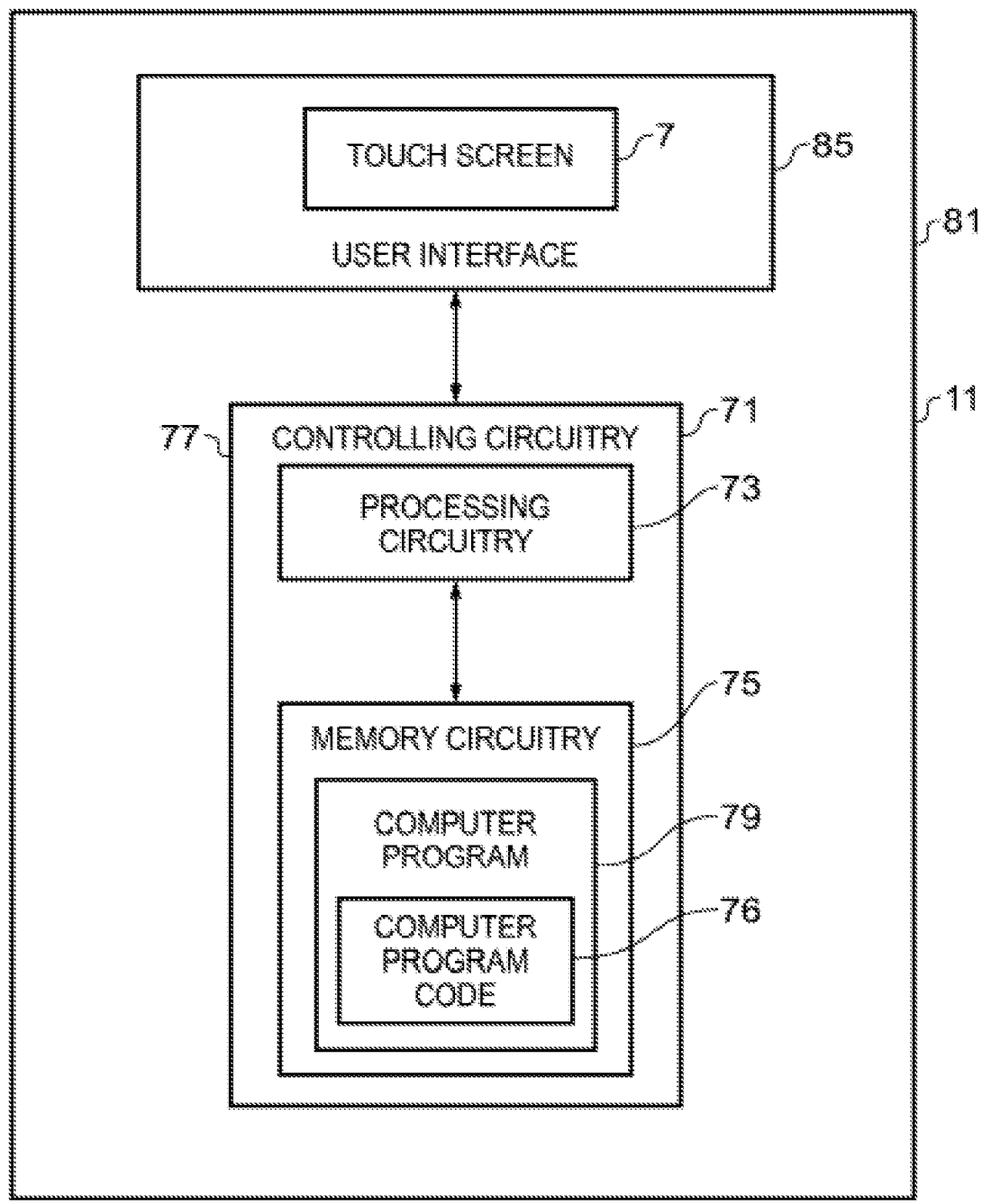
FIG. 8 illustrates an example communication device.

FIG. 8 schematically illustrates an example communication device 81 comprising an electronic device 71 according to an example of the disclosure. Corresponding reference numerals are used for corresponding features.

The communication device 81 may be any device which may be configured to read data from an apparatus 1 such as the apparatus 1 described above. In particular the communication device 81 may be configured to read data from an apparatus 1 using a capacitive touch screen.

The communication device 81 may be, for example, a mobile cellular telephone, a tablet computer, a personal computer, a camera, a gaming device, a personal digital assistant, an electronic book reader, a personal music player, a television or any other suitable communication device 81. The communication device 81 may be a handheld electronic device 19 which can be carried in a user's hand or bag. The communication device 81 may be a hand held device such that it is sized and shaped so that the user can hold the communication device 81 in their hand while they are using the communication device 81.

It is to be appreciated that only features necessary for the understanding of the description are illustrated in FIG. 8. The communication device 81 may comprise additional features that are not illustrated. For example, the communication device 81 may also comprise one or more transmitters and receivers configured to enable wireless communication.

Figure 9:
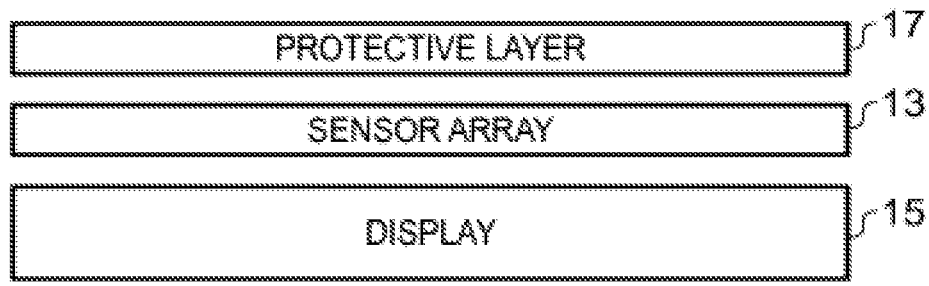
FIG. 9 illustrates a cross section through a capacitive touch screen.

The communication device 81 illustrated in FIG. 8 comprises: a user interface 85 and an electronic device 71. The electronic device 71 may comprise controlling circuitry 73 as described above in relation to FIG. 7. The user interface 85 may comprise a capacitive touch screen 7. The capacitive touch screen 7 may be as illustrated in FIG. 9 and described below.

The controlling circuitry 77 may be configured to control the communication device 81 to perform a plurality of different functions. For example, where the electronic device 71 is provided within a mobile cellular telephone the controlling circuitry 77 may be configured to control the communication device 81 to make and receive telephone calls and also to perform other functions such as send messages or access communication networks. The controlling circuitry 77 may be configured to receive input commands from the user interface 85 and also to provide output commands to the user interface 85.

In the example illustrated in FIG. 8 the user interface 85 comprises a capacitive touch screen 7. In some examples the user interface 85 may also comprise other user input devices such as a keypad, a joystick or navigation key or a combination of different types of user input devices. In some examples the user interface 85 may also comprise user output devices such as a display or audio output device or any other suitable output device.

The capacitive touch screen 7 may comprise any means which may be configured to detect conductive objects which are positioned in proximity to the capacitive touch screen 7. The capacitive touch screen 7 may be configured to enable a user to make an input into the communication device 81 by touching the surface of the capacitive touch screen 7 with an object or bringing an object into proximity of the surface of the capacitive touch screen 7. The objects used to make the user input could be any of a user's fingers including their thumbs or an apparatus 1 as described above.

A cross section through an example capacitive touch screen 7 is illustrated schematically in FIG. 9. The example capacitive touch screen 7 comprises a display 15, a sensor array 13 and a protective layer 17. It is to be appreciated that in other examples the capacitive touch screen 7 may comprise other components.

The display 15 may comprise any means which enables information to be displayed to a user of the communication device 81. The information may correspond to information which has been read from an apparatus 1 via the capacitive touch screen 7 and/or information which is stored in the memory circuitry 75 or any other information.

The display 15 may comprise any suitable display such as a liquid crystal display, light emitting diode, organic light emitting diode, thin film transistor or any other suitable type of display. The display 15 may comprise a plurality of pixels. The pixels may be addressed individually to enable individual pixels or groups of pixels to be illuminated.

The sensor array 13 may be positioned overlaying the display 15. The sensor array 13 may comprise any means which may be configured to detect conductive objects positioned close to the capacitive touch screen 7. The sensor array 13 may be configured to detect a plurality of conductive objects positioned close to the capacitive touch screen 7. The sensor array 13 may be configured to detect the plurality of objects simultaneously.

The sensor array 13 may comprise a layer of capacitive material. In some embodiments of the disclosure the capacitive material may be arranged in a grid or other suitable array. The capacitive material may be transparent to enable the display 15 to be visible though the sensor array 13. The capacitive material may comprise any suitable material such as indium tin oxide.

When a conductive object is positioned close to the capacitive touch screen 7 this causes charge to be sourced or sunk by the capacitive sensor array 13 which changes the capacitance of the sensor. This enables the conductive object to be detected.

In the example embodiment of FIG. 9 a protective layer 17 is provided overlaying the sensor array 13 and display 15. The protective layer 17 may provide a surface upon which an apparatus 1 may be positioned. The surface may be part of the housing 11 of the communication device 81. The controlling circuitry may be provided within the housing 11 of the communication device 81.

In some examples the protective layer 17 may form part of a housing of the communication device 81. The surface of the protective layer 17 may form a part of the outer surface of the communication device 81.

The protective layer 17 may be transparent so that the display 15 is visible through the protective layer 17. The protective layer 17 may comprise an insulating material.

Figure 10:
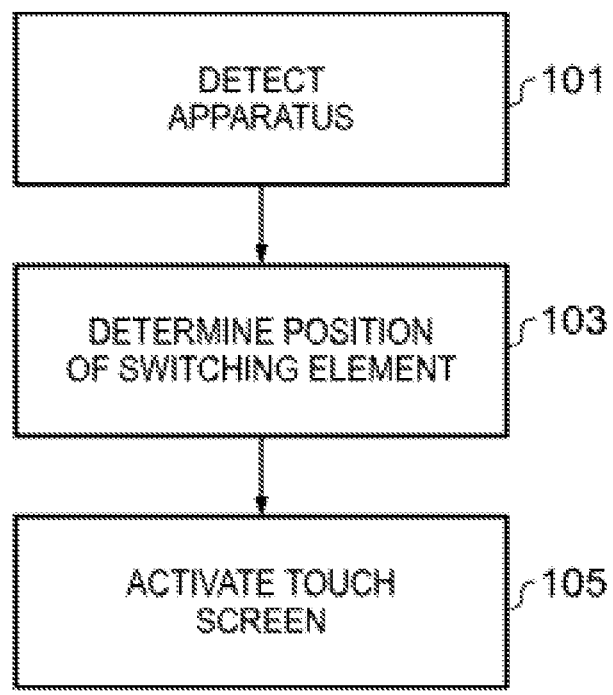
FIG. 10 illustrates a method of controlling an electronic device.

FIG. 10 illustrates a method of controlling an electronic device 71. The method comprises, at block 101, detecting an apparatus 1 overlaying a capacitive touch screen 7. The method also comprises, at block 103, determining a position of a switching element 5 within the apparatus 1. At block 105 the method comprises activating the capacitive touch screen 7 in a region underneath the switching element to enable data to be read from the apparatus 1.

In some examples once the data has been read from the apparatus 1 it may be displayed on the capacitive touch screen 7.

Figure 11:
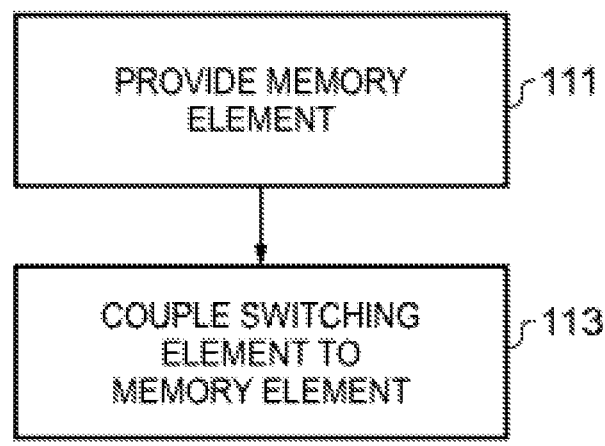
FIG. 11 illustrates a method of providing an apparatus.

FIG. 11 illustrates a method of providing an apparatus 1. The method comprises providing, at block 111 a memory element 3 configured to store information. The method also comprises, at block 113 coupling a switching element 5 to the memory element 3. The switching element 5 is configured to be switched from a first state to a second state in response to an input signal provided by a capacitive touch screen 7 and wherein when the switching element 5 is in the second state the data can be read from the memory element 3 by the capacitive touch screen 7.

Examples of the disclosure provide an apparatus 1 which may be manufactured using mass production methods. This may enable the apparatus 1 to be manufactured at a low cost. Also the apparatus 1 may be configured so that the information may be read from the apparatus 1 using a capacitive touch screen 7 as a reader. As a capacitive touch screen 7 may be provided within a device such as a mobile telephone or a tablet computer this may enable the information to be easily retrieved from the apparatus 1. This makes the apparatus 1 suitable for use as an identification tag or smart label.

Examples of the disclosure also provide an apparatus 1 with a large storage capacity as a large number of memory elements 3 can be provided within the apparatus 5. As each electrode within the apparatus 1 can be associated with multiple switching elements 3 and memory elements 5 this may enable a larger amount of information to be stored in the apparatus 1. Also as some of the memory elements 3 may be read simultaneously this may enable the information to be read quickly.

In this description the term coupled means operationally coupled. It is to be appreciated that any number or combination of intervening elements can exist (including no intervening elements) between coupled elements.

In some, but not necessarily all, examples there may be provided an electronic device 71 comprising: means for detecting an apparatus 1 overlaying a capacitive touch screen 7; means for determining a position of a switching element 5 within the apparatus 1; means for activating the capacitive touch screen 7 in a region underneath the switching element 5 to enable data to be read from the apparatus 1.

As used here 'module' refers to a unit or apparatus that excludes certain parts/components that would be added by an end manufacturer or a user.

The term "comprise" is used in this document with an inclusive not an exclusive meaning. That is any reference to X comprising Y indicates that X may comprise only one Y or may comprise more than one Y. If it is intended to use "comprise" with an exclusive meaning then it will be made clear in the context by referring to "comprising only one . . . " or by using "consisting".

In this brief description, reference has been made to various examples. The description of features or functions in relation to an example indicates that those features or functions are present in that example. The use of the term "example" or "for example" or "may" in the text denotes, whether explicitly stated or not, that such features or functions are present in at least the described example, whether described as an example or not, and that they can be, but are not necessarily, present in some of or all other examples. Thus "example", "for example" or "may" refers to a particular instance in a class of examples. A property of the instance can be a property of only that instance or a property of the class or a property of a sub-class of the class that includes some but not all of the instances in the class. It is therefore implicitly disclosed that a features described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. An apparatus comprising:
a memory element configured to store information; and
a switching element coupled to the memory element,
wherein the switching element is configured to be switched from a first state to a second state in response to an input signal from a capacitive touch screen external to the apparatus and wherein when the switching element is in the second state, the memory element is configured to provide at least part of the information in the memory element to the capacitive touch screen external to the apparatus.

2. An apparatus as claimed in claim 1 wherein the memory element is configured to store identification information.

3. An apparatus as claimed in claim 1 wherein the memory element comprises a sensor element and is configured to store information obtained by the sensor element.

4. An apparatus as claimed in claim 1 wherein the apparatus comprises a plurality of memory elements and a plurality of switching elements.

5. An apparatus as claimed in claim 4, wherein the memory element and the switching element are configured to activate areas of the capacitive touch screen underneath the plurality of switching elements sequentially.

6. An apparatus as claimed in claim 5, wherein activating areas of the capacitive touch screen comprises activating pixels in a region of the capacitive touch screen underneath the plurality of switching elements.

7. An apparatus as claimed in claim 1 wherein the switching element is configured to be switched from the first state to the second state by light from the capacitive touch screen external to the apparatus.

8. An apparatus as claimed in claim 7 wherein a plurality of switching elements are provided and different switching elements may be configured to be switched from the first state to the second state by different wavelengths of light.

9. An apparatus as claimed in claim 1 wherein the switching element comprises a transistor and a switching component.

10. An apparatus as claimed in claim 1 further comprising at least one reference electrode wherein the reference electrode is configured to enable the capacitive touch screen external to the apparatus to determine the positions of the switching elements.

11. An apparatus as claimed in claim 1 wherein the apparatus is transparent so that the data obtained by the external capacitive touch screen may be displayed on the capacitive touch screen external to the apparatus and viewed through the apparatus.

12. An apparatus as claimed in claim 1 wherein the apparatus is part of an identification tag.

13. An apparatus as claimed in claim 1 wherein the memory element and the switching element are configured to enable an electrode to be connected and disconnected to ground.

14. A method comprising:
providing an apparatus comprising a memory element configured to store information; and
coupling a switching element to the memory element;
wherein the switching element is configured to be switched from a first state to a second state in response to an input signal from a capacitive touch screen external to the apparatus and wherein when the switching element is in the second state the memory element is configured to provide at least part of the data in the memory element to the capacitive touch screen external to the apparatus.

15. An electronic device comprising:
processing circuitry;
memory circuitry including computer program code; and
a capacitive touch screen;
the memory circuitry and the computer program code configured to, with the processing circuitry, cause the electronic device at least to perform:
detecting an apparatus external to the electronic device overlaying the capacitive touch screen external to the apparatus;
determining a position of at least one reference electrode of the apparatus;
using the determined position of the at least one reference electrode of the apparatus to determine a position of a switching element within the apparatus; and
activating the capacitive touch screen in a region underneath the switching element to enable data to be read from the apparatus by the capacitive touch screen, wherein the switching element is configured to be switched from a first state to a second state by light from the capacitive touch screen external to the apparatus.

16. An electronic device as claimed in claim 15 wherein a plurality of switching elements are provided and different switching elements may be configured to be switched from the first state to the second state by different wavelengths of light.

* * * * *